(12) United States Patent
Aizawa et al.

(10) Patent No.: US 6,457,870 B2
(45) Date of Patent: Oct. 1, 2002

(54) SEALED ROLLING BEARING

(75) Inventors: Tomoyuki Aizawa, Tokyo; Eiichi Kawamura; Kazuo Akagami, both of Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/769,254

(22) Filed: Jan. 26, 2001

Related U.S. Application Data

(63) Continuation of application No. 09/362,194, filed on Jul. 28, 1999, now abandoned.

(30) Foreign Application Priority Data

Jul. 29, 1998 (JP) .............................................. 10-227525
Jul. 22, 1999 (JP) ........................................... 11-208150

(51) Int. Cl.⁷ .............................................. F16C 33/78
(52) U.S. Cl. ...................... 384/477; 277/928; 384/484
(58) Field of Search ................................ 384/474, 479, 384/484, 485, 486, 520, 551; 277/552, 928

(56) References Cited

U.S. PATENT DOCUMENTS

| 4,692,040 A | * | 9/1987 | Ebaugh et al. ............... 384/484 |
| 4,997,294 A | * | 3/1991 | Hillmann ..................... 384/484 |
| 5,118,206 A | | 6/1992 | Otto et al. .................... 384/477 |
| 5,213,342 A | * | 5/1993 | Weber ..................... 384/485 X |
| 5,362,159 A | | 11/1994 | Kufner et al. ............... 384/484 |
| 5,492,419 A | * | 2/1996 | Miller et al. ................. 384/551 |

FOREIGN PATENT DOCUMENTS

| GB | 2 185 076 | 7/1987 |
| JP | 60-14933 | 4/1985 |
| JP | 60-115609 | 8/1985 |
| JP | 61-12130 | 4/1986 |
| JP | 9-174123 | 7/1997 |
| JP | 9-329243 | 12/1997 |

* cited by examiner

*Primary Examiner*—Thomas R. Hannon
(74) *Attorney, Agent, or Firm*—Miles & Stockbridge P.C.

(57) ABSTRACT

A sealed rolling bearing in which a rolling member is disposed in a bearing space formed between an outer race and an inner race to rotate the outer race and the inner race relatively to each other, and rotation seal members are disposed at both ends of the bearing space in the axial direction thereof while a stationary seal member is disposed on the side of the inner race, thereby sealing the bearing space. The bearing is provided with a vent on the side of the inner race for approximating a fluid pressure in the bearing space to an outside fluid pressure by causing the inside of the bearing space to communicate with the outside when the state of fluid in the bearing space and state of the outside fluid have a predetermined relationship.

18 Claims, 22 Drawing Sheets

TEST RESULT OF INTERMEDIATE SEAL
VENT FUNCTION (STOPPED STATE)

TEST RESULT OF INTERMEDIATE SEAL
VENT FUNCTION (ROTATING STATE)

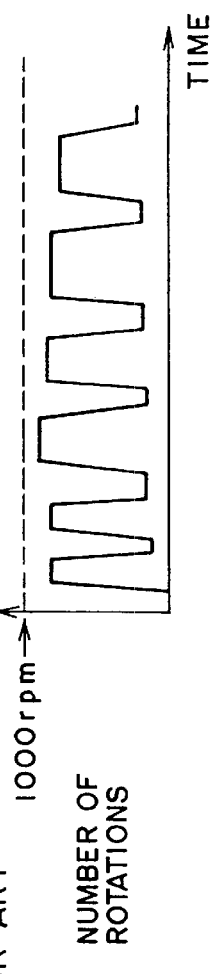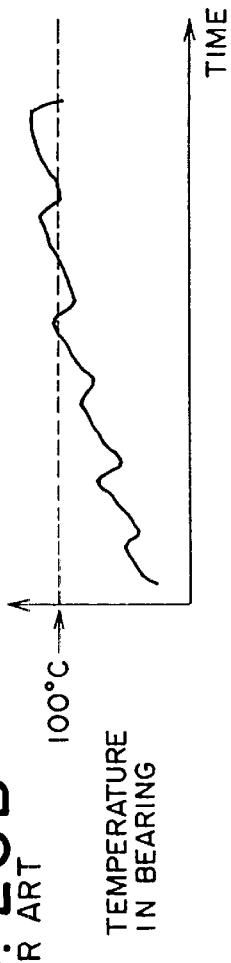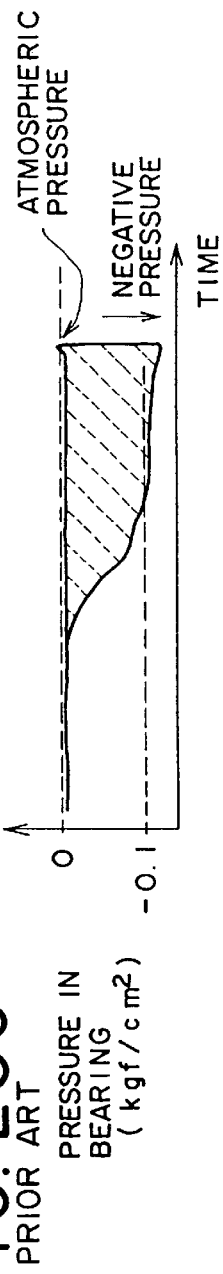

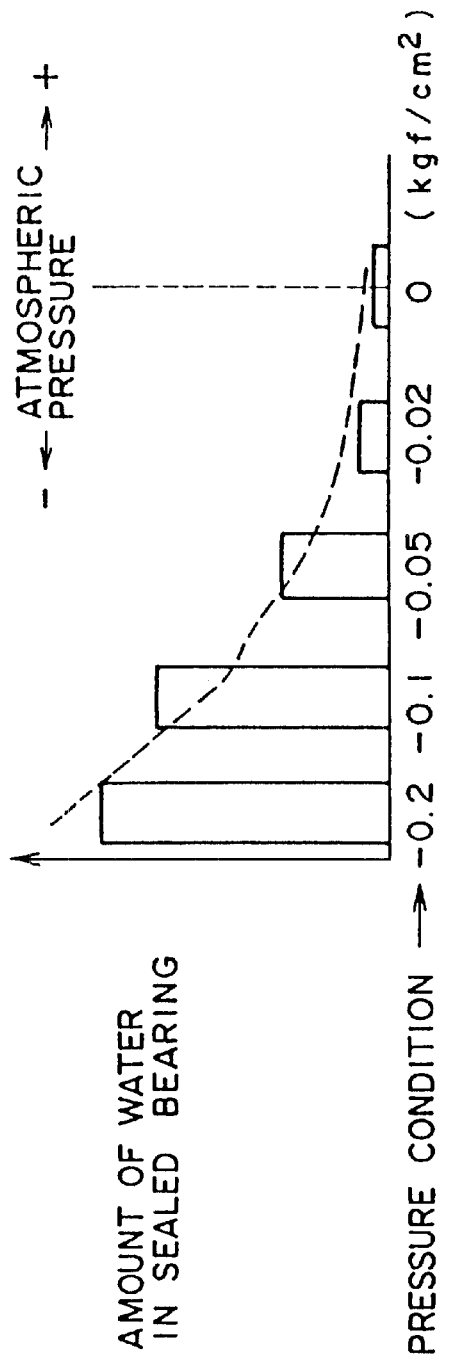

SEALED ROLLING BEARING

CROSS-REFERENCE TO RELATED APPLICATIONS

This application is a continuation of U.S. application Ser. No. 09/362,194 filed July 28, 1999, now abandoned which is incorporated herein by reference.

This application claims the benefits of Japanese Application Nos. 10-227525 and 11-208150 which are hereby incorporated by reference.

BACKGROUND OF THE INVENTION

1. Field of the Invention

The present invention relates to a sealed rolling bearing having a design for preventing water, or the like, from invading from outside into the bearing space.

2. Related Background Art

As a bearing to be used in an environment in which it may be splashed with fluid including water, such as a roll neck bearing of a rolling mill in steel mill equipment, a sealed rolling bearing provided with a sealing device as proposed in Japanese Patent Publication No. 60-14933, No. 61-12130, or the like, is used.

A four-row tapered roller bearing provided with a seal for hermetically sealing is shown in FIG. 30 as one example of the sealed rolling bearing. Note that FIG. 30 shows an upper half of the longitudinal cross-section of the bearing excluding the shaft thereof.

The sealed roller bearing shown in the same Figure is provided with a large number of rollers 4, 4, . . . which are supported by a four-row retainer to be rotatable, in a bearing space S between outer races 1, 1, 2 and inner races 3, 3, so as to enable the rotation of the inner races 3, 3 with respect to the outer races 1, 1, 2. Further, seal holders 7, 7 are disposed at the outside ends of the outer races 1, 1 in the axial direction thereof, so as to support seals 8, 8, whereby elastic lips 8a, 8a of the seals 8, 8 are brought into contact with the outer peripheral surfaces of the inner races 3, 3 at the outside ends in the axial direction thereof. Consequently, it is possible to retain a lubricating member inside the bearing space, and to prevent fluid such as water from invading into the bearing space S.

FIG. 31 is a view for illustrating the shape of an intermediate seal 019 which is retained on the inner surface of a portion in which the inner races 3, 3 are in contact with each other. This intermediate seal 019 is arranged to prevent water, or the like, from invading into the bearing space S chiefly when a roll is attached or detached.

FIG. 22 shows another example 9' of the intermediate seal which has been conventionally used. This intermediate seal 019' has lip portions 019a, 019b which are brought into linear contact with the bottom surfaces 3b, 3b of a recess formed by the facing portions of the inner races 3, 3. The contact surface pressure is increased by this linear contact, thereby sealing the inside and the outside of the bearing.

PROBLEMS TO BE SOLVED BY THE INVENTION

The conventional hermetically sealed rolling bearing mentioned above can not satisfactorily prevent the invasion of water or the like, under a severe environment with drastic change in temperature.

For example, when the sealed rolling bearing shown in FIG. 30 is used as a roll neck bearing for a rolling mill in steel mill equipment, the number of rotations of the roll which is supported by this hermetically sealed rolling bearing is frequently changed. More specifically, a high-speed rotation, low idling rotation, and a halt are repeated for the roll, and the temperature inside the sealed rolling bearing changes depending on each of the conditions. For this reason, expansion and contraction of the air or the like in the bearing space are repeated, the internal air which is expanded upon the increase in the temperature escapes from the elastic seals 8, 8 on the end surfaces, and the pressure inside the sealed rolling bearing becomes negative when the temperature is decreased for the second time.

The value of this negative pressure becomes larger and is maintained longer when the temperature inside the bearing space S which has been high becomes lower (or a difference of the temperature is larger), that is, the number of rotations of the roll which has been rotating at a high speed becomes smaller (a difference of rotation is larger). These conditions are shown in FIG. 28A, FIG. 28B and FIG. 28C. These views respectively show the number of rotations of the roll, the temperature in the bearing (the temperature inside the bearing space S), and the internal pressure of the bearing (the pressure in the bearing space S), with respect to time (along the abscissa) in that order.

Also, when the internal temperature is 100° C. or higher with a little water existing inside, this water is expanded as vapor, and a large negative pressure is generated when the temperature decreases. This negative pressure accelerates abrasion of the elastic seal lips of the seals 8, 8, to degrade the function of the seals 8, 8, which is a great cause of water invasion from the seals 8, 8.

As described above, it is confirmed that when a great negative pressure is generated in the bearing space S, the greater the negative pressure is, the easier the invasion of external fluid such as water through the lip portion 8a of the elastic seal becomes. More specifically, as clearly seen from FIG. 29, the greater the negative pressure is (more to the left of the abscissa in the figure), the easier the flow of water into the sealed bearing becomes, thereby increasing an amount of the mixed water. The easier inflow of water means a degraded sealing function. In addition, the water inflow and the degraded sealing function accelerate deterioration of the lubricant in the bearing space S to degrade the bearing performance, thereby causing early damage or early peeling-off.

SUMMARY OF THE INVENTION

Accordingly, an object of the present invention is to provide a hermetically sealed rolling bearing capable of preventing deterioration of a lubricant due to the inflow of water which may be caused by the negative pressure in the bearing space, thereby preventing deterioration of the bearing performance, early damage, early peeling-off, etc.

In order to achieve the above object, there is provided a hermetically sealed rolling bearing in which rolling members are disposed in a bearing space formed between an outer race and an inner race to rotate the outer race and the inner race relatively to each other, and side seal members are disposed at the ends of the bearing space in the axial direction thereof while a bore seal member is disposed on the side of the inner race, thereby sealing the bearing space, characterized in that: there is provided vent means on the side of the inner race for approximating a fluid pressure in the bearing space to an outside fluid pressure when the state of the fluid in the bearing space and the state of the outside fluid becomes a predetermined relationship.

Here, in the sealed rolling bearing according to the present invention, there is provided the vent means on the inner race side to approximate the fluid pressure in the bearing space to the fluid pressure outside when the state of the fluid in the bearing space and the state of the fluid outside reaches a predetermined relationship. Thus, even if, for example, the heated sealed rolling bearing is cooled, the fluid pressure in the bearing space is approximated to the fluid pressure outside so as not to pull the water or the like into the bearing space. Also according to an especially preferred mode of the present invention, the vent mechanism is disposed at a position which is hardly exposed to external water or the like so that the above-mentioned function can be realized in a simpler and a more secure manner.

BRIEF DESCRIPTION OF THE DRAWINGS

FIG. 28A is a graph for showing the number of rotation, FIG. 28B is a graph for showing the temperature inside the bearing, and FIG. 28C is a graph for showing the pressure inside the bearing, respectively for the used time of the bearing.

FIG. 29 is a graph for showing the internal pressure of the bearing and an amount of mixed water inside the bearing, with respect to the sealed rolling bearing of the prior art.

DESCRIPTION OF THE PREFERRED EMBODIMENTS

Embodiments of the present invention will be described below with reference to the drawings.

(First Embodiment)

Figure 1:
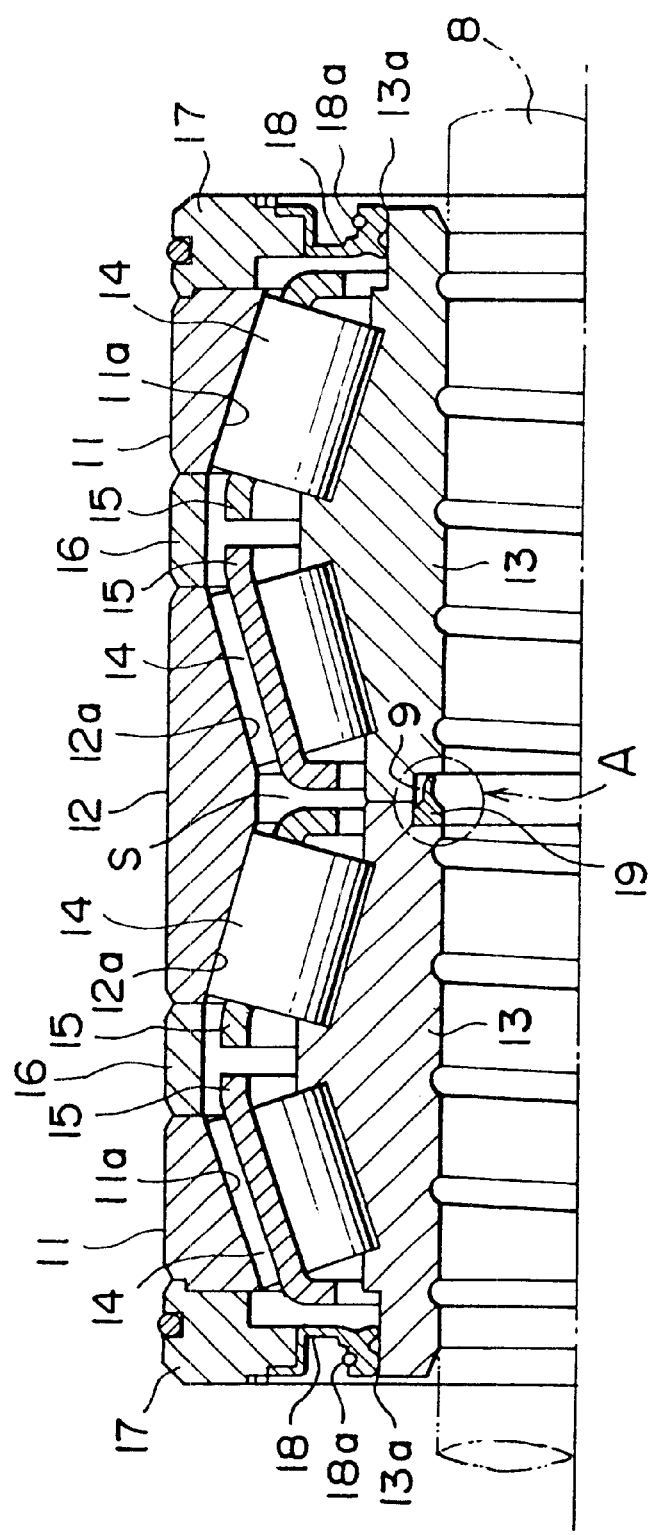
FIG. 1 is a longitudinal cross-sectional view for showing the structure of a rolling bearing according to the first embodiment of the present invention.

FIG. 1 shows a longitudinal cross section of a four-row tapered roller bearing provided with a seal for hermetically sealing as a first embodiment of a sealed rolling bearing according to the present invention. Note that this view shows an upper part of the longitudinal cross section of the bearing excluding the shaft thereof.

The four-row tapered roller bearing with the seal for hermetically sealing (hereinafter called the "sealed rolling bearing") shown in FIG. 1 comprises outer races 11, 12, 11, inner races 13, 13, a large number of rollers 14, 14, . . . which are disposed between the outer races 11, 11, 12 and the inner races 13, 13, retainers 15, 15, . . . for supporting these rollers 14, 14, outer race intermediate rings 16, 16 which are disposed between the outer race 12 and the outer races 11, 11, seal holders 17, 17 which are disposed at the end portions of the outer races 11, 11, side seals 18, 18 supported by the seal holders 17, 17, and an intermediate seal 19 retained by a recess 9 which is formed on the inner diameter surface of a portion in which the pair of inner races 13, 13 are brought into contact.

The whole outer race is constituted by the single-row outer races 11, 11 disposed at the outside end portions in the axial direction and the double-row outer race 12 which is formed by two single-row outer races connected with each other. Taper surfaces 11a, 11a, 12a are formed on the inner peripheries of the outer races 11, 11, 12, respectively.

The whole inner race is constituted by the two double-row inner races 13, 13 which are aligned in the axial direction. The outer peripheries of the inner races 13, 13 are corresponding to the taper surfaces 11a, 12a of the outer races 11, 12 mentioned above, so as to constitute a bearing space S with these taper surfaces 11a, 12a. A roll shaft 8 is loosely fitted in the inner races 13, 13. That is, the inner peripheries of the inner races 13, 13 are fitted on the outer periphery of the roll shaft 8 with a small gap therebetween. The right and left end portions of the inner races 13, 13 in the axial direction are extended to be longer than those of the outer races 11, 11, and lip sliding surfaces 13a, 13a which are in contact with elastic lips 18a, 18a of the side seals 18, 18 are formed in these extended portions.

The four rows of rollers 14, 14, 14, 14 serving as rolling members are disposed in the above-mentioned bearing space S, and are brought into contact with the taper surfaces 11a, 12a of the outer races 11, 12 and the outer peripheral surfaces of the inner races 13, 13. Each of the rollers 14 is rotated in a predetermined direction when the inner races 13, 13 are rotated upon rotation of the roll shaft 8, whereby the inner races 13, 13 are smoothly rotated with respect to the outer races 11, 12.

The four annular retainers 15, 15, . . . are disposed in the above-mentioned bearing space S, and each of the retainers 15 supports a large number of rollers 14, 14, . . . in the circumferential direction to be rotatable.

The outer race intermediate rings 16, 16 are formed to be annular, and are interposed between the double-row outer race 12 and the single-row outer race 11 on the tip end (left) side and between the double-row outer race 12 and the single-row outer race 11 on the base end (right) side, respectively.

The seal holders 17, 17 are disposed in the tip end portion of the outer race 11 on the tip end side (the left one in FIG. 1), out of the two outer races 11, 11, and in the base end portion of the outer race 11 on the base end side (the right one in FIG. 1), respectively, so as to retain the side seals 18, 18 on the inner peripheral side thereof, respectively.

The side seals 18, 18 which serve as rotation seal members are supported on the inner peripheral sides of the above-mentioned seal holders 17, 17, so as to bring the elastic lips 18a, 18a into contact with the lip sliding surfaces 13a, 13a of the inner races 13, 13 mentioned above, thereby sealing hermetically the bearing space S of the sealed rolling bearing 10.

The intermediate seal 19 serving as a bore seal member is formed to be annular and is fitted to be retained in a recess 9 formed on the inner diameter surface side of surfaces with which the pair of the inner races 13, 13 are brought into contact to be opposite to each other. In a part of this intermediate seal 19, there is formed a vent portion described later (omitted in FIG. 1) for venting the air under an appropriately applied pressure.

Figure 2A:
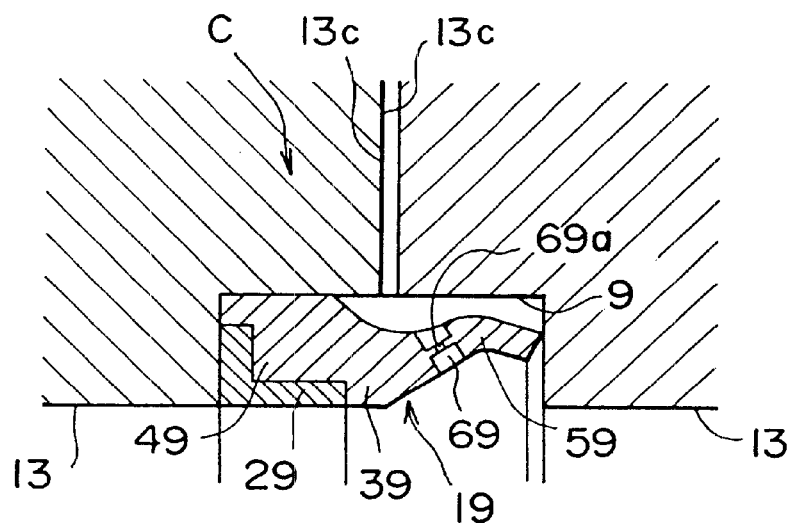
FIG. 2A is an enlarged cross-sectional view for illustrating a seal formed between inner races of the sealed rolling bearing shown in FIG. 1.
Figure 2B:
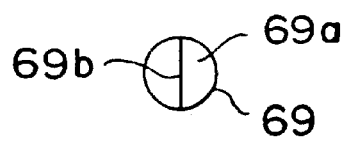
FIG. 2B is a view for illustrating the main portion of this seal.

FIG. 2A is a partial enlarged cross-sectional view for illustrating the portion A in FIG. 1, in order to describe the structure of the intermediate seal 19. FIG. 2A is an enlarged view of a cross section of the intermediate seal 19, while FIG. 2B is an enlarged view of the vent portion of the intermediate seal 19, seen from the direction indicated by the arrow C.

The intermediate seal 19 is comprised of a core metal 29 for maintaining the shape of the seal, and an elastic member 39 such as a rubber tightly in contact with the recess 9. A lip 59 having elasticity is extended from the main part 49 of the elastic member 39. The main part 49 is brought into contact with the bottom wall and the side wall of the recess of one of the inner races 13, and the lip 59 is brought into contact with the side wall of the recess of the other inner race 13. As a result, a gap between the contact surfaces 13c, 13c of the paired inner races 13, 13 is sealed, thereby maintaining the air-tight condition in the bearing space S.

On the root side of the lip 59, there is formed a vent hole 69 serving as the vent means. Vent holes 69 may be formed over the entire periphery of the intermediate seal 19 at appropriate intervals. A partition wall 69a is formed integrally in a middle part of each vent hole 69. This partition wall 69a is formed of a thin elastic member, and is provided with a slit 69b which is extended diametrically across the wall.

The slit 69b functions as a valve mechanism and is closed when no pressure difference is generated between the inside of the bearing (the bearing space S in FIG. 1) and the outside of the bearing, but forms a small gap when a pressure difference is generated between the inside of the bearing and the outside of the bearing (for example, when the pressure inside the sealed rolling bearing becomes negative), thereby providing the vent mechanism. Even if the air volume in the bearing changes due to a change in temperature inside the bearing during the operation of the sealed rolling bearing, the air can be sucked from the outside of the bearing into the bearing or can be evacuated from the inside of the bearing to the outside of the bearing by means of a function of the slit 69b, whereby the pressure difference between the inside and the outside of the bearing can be automatically balanced.

In addition, the slit 69b is usually closed unless a considerable pressure is applied, so as to serve to prevent water or other pollutant from invading into the bearing through the vent hole 69. Here, the slit 69b is disposed at a position which is hardly exposed to the water or other liquid, compared with the case in which the vent hole is formed on the seal holder 17 or on the side seal 18, so that the invasion of water or the like into the bearing through the vent hole 69 can be securely prevented.

Note that the slit 69b as mentioned above is provided on the intermediate seal 19 for sealing the gap between the inner races 13, 13, and can approximate the pressure inside the bearing to the external pressure in a simpler manner, compared with the case that the housing itself such as a chock in a case where the sealed rolling bearing is adopted in a rolling mill, for example, is subjected to some processing, and can prevent water or the like from invading into the bearing through the vent hole 69.

(Second Embodiment)

A sealed rolling bearing according to a second embodiment of the invention will be described in the following. Note that the sealed rolling bearing according to the second embodiment is the same as that according to the first embodiment shown in FIG. 1, apart from an intermediate seal 119.

In the following description of each of the embodiments, identical portions are given the same reference numbers and symbols to save redundant description.

Figure 3A:
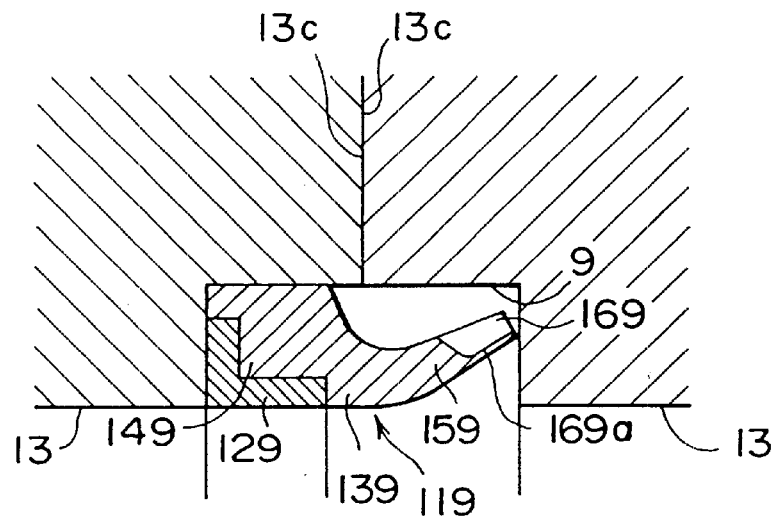
FIG. 3A is an enlarged cross-sectional view for illustrating a seal formed between inner races of a sealed rolling bearing according to the second embodiment of the present invention.
Figure 3B:
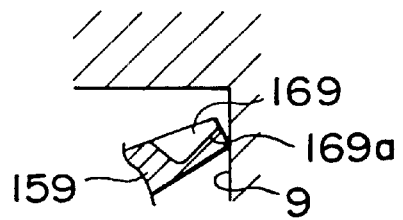
FIG. 3B is a view for illustrating the main portion of the seal.

FIG. 3 is a view for illustrating the structure of the intermediate seal 119 for sealing a sealed rolling bearing on the side of the inner races 13, 13. FIG. 3A is an enlarged cross-sectional view of the intermediate seal 119, while FIG. 3B is a view for illustrating an operation of a vent portion of the intermediate seal 119.

The intermediate seal 119 is comprised of a core metal 129 for maintaining the shape of the seal, and an elastic member 139 in tight contact with the recess 9. A lip 159 having elasticity is extended from the main part 149 of the elastic member 139. The main part 149 is brought into contact with the bottom wall and the side wall of the recess of one of the inner races 13, and the lip 59 is brought into contact with the side walls of the other inner race 13. As a result, a gap between the contact surfaces 13c, 13c of the paired inner races 13, 13 is sealed, thereby maintaining the air-tight condition inside the bearing.

On the tip end side of the lip 159, there are formed cut-away portions 169. The cut-away portions 169 may be formed over the entire periphery of the intermediate seal 119 at appropriate intervals. A partition wall 169a is formed on the roll shaft side of each cut-away portion 169. This partition wall 169a is formed of a thin elastic member, and is in tight contact with the side surface of the recess 9 when no pressure difference is generated between the inside of the bearing and the outside of the bearing, but is separated a little from the side surface of the recess when a pressure difference is generated between the inside of the bearing and the outside (FIG. 3B), thereby providing a vent mechanism. Thus, even if the air volume in the bearing changes due to a change in temperature inside the bearing during the operation of the sealed rolling bearing, the pressure difference between the inside and the outside can be automatically balanced.

In addition, the partition wall 169a is usually in tight contact with the side surface of the recess 9 unless a considerable pressure is applied, and also serves to prevent water or other pollutant from invading into the bearing through the notch (cut-away) 169.

(Third Embodiment)

A sealed rolling bearing according to a third embodiment of the invention will be described below with reference to FIG. 4. Note that the sealed rolling bearing according to the third embodiment is the same as that according to the first embodiment, apart from an intermediate seal 219.

Figure 4:
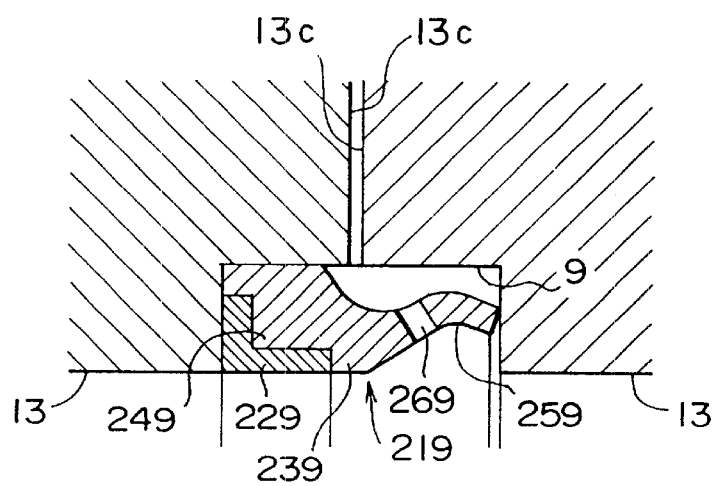
FIG. 4 is an enlarged cross-sectional view for illustrating a seal formed between inner races of a sealed rolling bearing according to the third embodiment of the present invention.

FIG. 4 is an enlarged cross-sectional view for illustrating the structure of the intermediate seal 219 for sealing the sealed rolling bearing on the side of the inner races 13, 13.

The intermediate seal 219 is comprised of a core metal 229 for maintaining the shape of the seal, and an elastic member 239 in tight contact with the recess 9. A lip 259 having elasticity is extended from the main part 249 of the elastic member 239. The main part 249 is brought into contact with the bottom wall and the side wall of the recess of one of the inner races 13, and the lip 259 is brought into contact with the side wall of the recess of the other inner race 13. As a result, a gap between the contact surfaces 13c, 13c of the paired inner races 13, 13 is sealed, thereby maintaining the air-tight condition inside the bearing.

On the root side of the lip 259, there are formed vent holes 269. The vent holes 269 may be formed over the entire periphery of the intermediate seal 219 at appropriate intervals. Each vent hole 269 is formed to be open and has no partition wall on which a slit serving as a valve mechanism is formed. Even if the vent mechanism is formed by the vent hole 269 and the air volume inside the bearing changes due to a change in temperature inside the bearing, the air can be sucked from the outside of the bearing into the bearing or can be evacuated from the inside of the bearing to the outside of the bearing, whereby the pressure difference between the inside and the outside of the bearing can be automatically balanced.

Taking into consideration the fact that the sealed rolling bearing according to the third embodiment is used in an environment into which water or the like hardly invade from the side of the inner races 13, 13, only the vent hole 269 itself is disposed at a position which is hardly exposed to water or the like directly, but no slit is formed to serve as the vent mechanism.

(Fourth Embodiment)

A sealed rolling bearing according to a fourth embodiment of the invention will be described below with reference to FIG. 5. Note that the sealed rolling bearing according to the fourth embodiment is the same as that according to the first embodiment, apart from portions described below.

Figure 5:
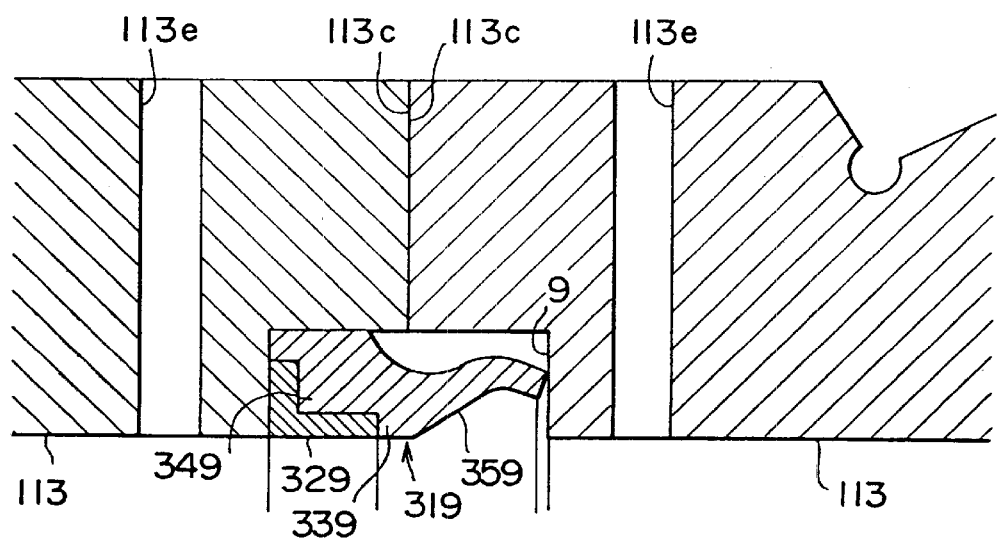
FIG. 5 is an enlarged cross-sectional view for illustrating a seal formed between inner races of a sealed rolling bearing according to the fourth embodiment of the present invention.

FIG. 5 is an enlarged cross-sectional view for illustrating the structure of a portion in which the inner races 113, 113 for forming the sealed rolling bearing are brought into contact with each other and the structure of an intermediate seal 319.

In the vicinity of the contact surface 113c of each inner race 113, there is formed a vent hole 113e. The vent holes 113e may be formed over the entire periphery of the inner race 113 at appropriate intervals.

The intermediate seal 319 is comprised of a core metal 329 for maintaining the shape of the seal, and an elastic member 339 in tight contact with the recess 9.

A lip 359 having elasticity is extended from the main part 349 of the elastic member 339. The main part 349 is brought into contact with the bottom wall and the side wall of the recess of one of the inner races 13, and the lip 359 is brought into contact with the side wall of the recess of the other inner race 113. A gap between the contact surfaces 113c, 113c of the paired inner races 113, 113 is sealed, thereby maintaining the air-tight condition inside the bearing. Note that the lip 359 has no vent hole.

In this embodiment, a vent mechanism is constituted by vent holes 113e, 113e formed through the inner races 113, 113. Thus, even if the air volume in the bearing changes due to a change in temperature inside the bearing, the air can be sucked from the outside of the bearing into the bearing or can be evacuated from the inside of the bearing to the outside of the bearing, whereby the pressure difference between the inside and the outside of the bearing can be automatically balanced. Each vent hole 113e, 113e may be provided with a proper valve mechanism as well as a proper thin portion wall which gas can pass through but fluid cannot.

(Fifth Embodiment)

A sealed rolling bearing according to a fifth embodiment of the invention will be described below with reference to FIG. 6. Note that the sealed rolling bearing according to the fifth embodiment is the same as that according to the first embodiment, apart from an intermediate seal 419.

Figure 6:
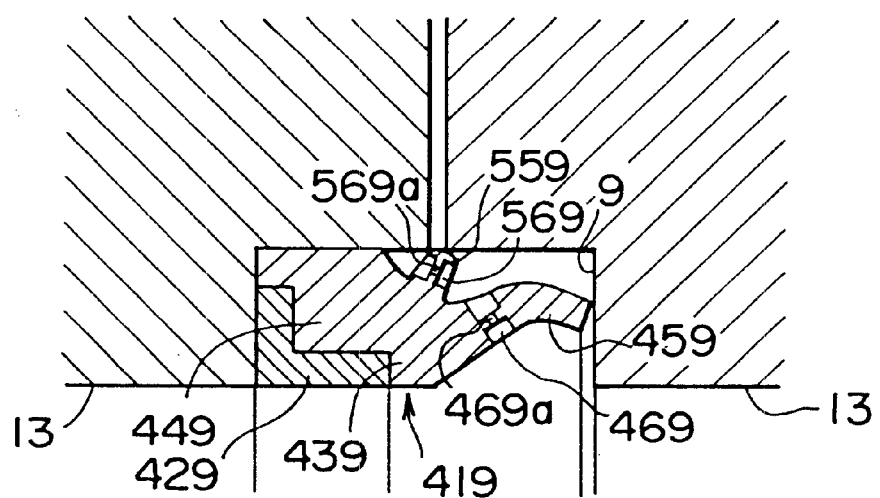
FIG. 6 is an enlarged cross-sectional view for illustrating a seal formed between inner races of a sealed rolling bearing according to the fifth embodiment of the present invention.

FIG. 6 is an enlarged cross-sectional view for illustrating the structure of the intermediate seal 419 for sealing a sealed rolling bearing on the side of the inner races 13, 13.

The intermediate seal 419 is comprised of a core metal 429 for maintaining the shape of the seal, and an elastic member 439 in tight contact with the recess 9. A pair of lips 459, 559 having elasticity are extended from the main part 449 of the elastic member 439. The lip 459 is brought into contact with the side wall of the recess 9, and the lip 559 is brought into contact with the bottom surface of the recess 9.

The lips 459, 559 are provided with vent holes 469, 569, respectively. These vent holes 469, 569 may be formed over the entire peripheries of the lips 459, 559 at appropriate intervals.

In a middle part of each of the vent holes 469, 569, there is formed a partition wall 469a or 569a. Each of these partition walls 469a, 569a is formed of a thin elastic member, and is provided with a slit which is extended diametrically across the wall and is similar to that shown in FIG. 2B, thereby providing a vent mechanism. In the case of this embodiment, a plurality of lips 459, 559 are provided for sealing to enhance the function of preventing invasion of water or the like. Here, since the positions of the vent holes 465, 569 provided on the lips 459, 559 are relatively deviated from each other, there is less possibility of invasion of water or the like into the bearing through both vent holes 469, 569.

(Sixth Embodiment)

A sealed rolling bearing according to a sixth embodiment of the invention will be described below with reference to FIGS. 7 and 8. Note that in the sealed rolling bearing according to the sixth embodiment, the inner races, the intermediate seal, etc., which form the sealed rolling bearing of the first embodiment are modified to have other structures.

Figure 7:
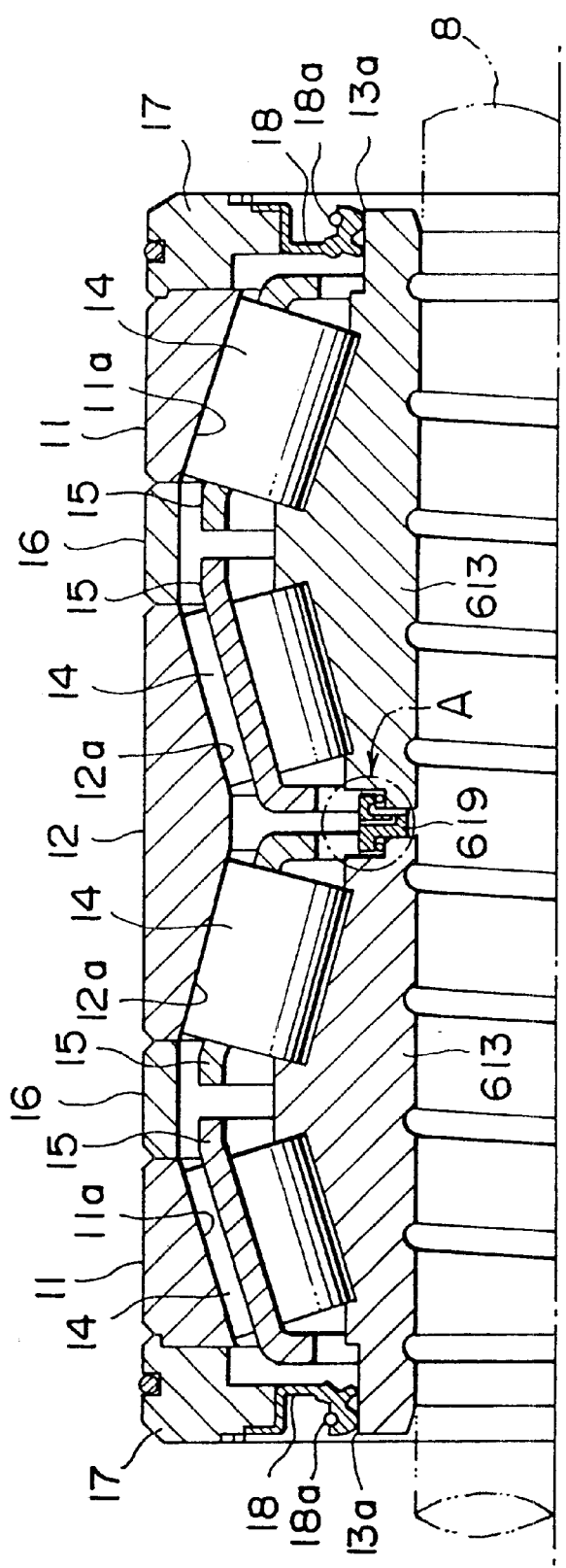
FIG. 7 is a longitudinal cross-sectional view for showing the structure of a rolling bearing according to the sixth embodiment of the present invention.

FIG. 7 shows a longitudinal cross section of a four-row tapered roller bearing provided with a seal for sealing as the sixth embodiment of a sealed rolling bearing according to the present invention. Note that this view shows an upper part of the longitudinal cross section of the bearing excluding the shaft thereof. Note that the four-row tapered bearing according to the sixth embodiment has the same structure as that shown in FIG. 1, apart from portions opposite to each other of the inner races 613, 613 and the structure of an intermediate seal 619 provided therein. Structural portions identical to those shown in FIG. 1 will be indicated only by the reference numerals and symbols and detailed description thereof will be omitted. Only the structural portions which are different from those in FIG. 1 will be described below.

In the sixth embodiment, a recess 609 (see FIG. 8) is formed on the outer diameter side of surfaces with which a pair of inner races 613, 613 are brought into contact with each other in an opposite manner, and the annular intermediate seal 619 is fitted in this recess 609 to be retained. A vent portion (omitted in FIG. 7) for ventilating the air under an appropriately applied pressure is formed in a part of this intermediate seal 619.

Figure 8:
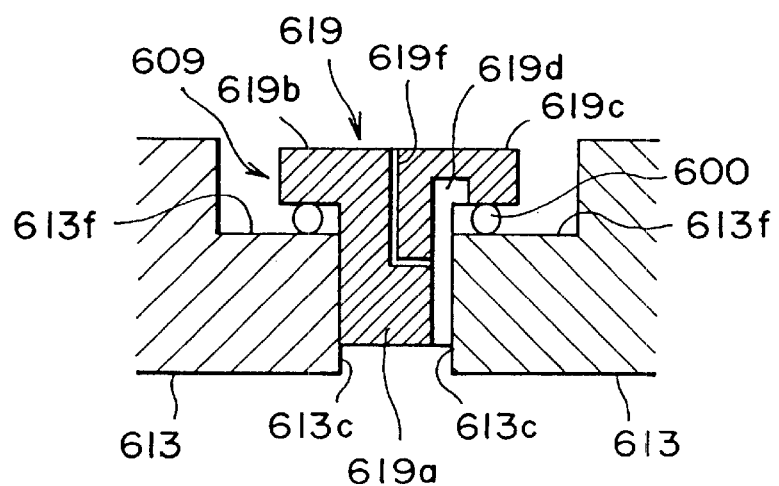
FIG. 8 is an enlarged cross-sectional view for illustrating a seal formed between inner races of the sealed rolling bearing according to the sixth embodiment of the present invention.

FIG. 8 is an enlarged cross-sectional view of the part A in FIG. 7, for illustrating the structure of the intermediate seal 619 for hermetically sealing the sealed rolling bearing on the inner diameter sides of the inner races 613, 613.

The intermediate seal 619 is comprised of a main body 619a and a pair of annular protrusions 619b, 619c both extended from the outer periphery thereof in the axial direction. The main body 619a is sandwiched by and between the end surfaces 613c, 613c of the paired inner races 613, 613 to be retained. O-rings 600, 600 for sealing are disposed between the lower surfaces of the annular protrusions 619b, 619c and the bottom surface portions of recess 609 formed on the paired inner races 613, 613. The inside and the outside of both inner races 613, 613 are sealed by these O-rings 600, 600, thereby maintaining the air-tight condition inside the bearing.

A part of the intermediate seal 619 which is approximated to one end surface 613c of the main body 619a of the seal is provided with a longitudinally elongated space 619d which is obtained by cutting away a part of the main body 619a. Such spaces 619d may be formed over the entire periphery of the bearing. This space 619d communicates with the outside of the bearing or the inner peripheries of the inner races 613, 613, so as to temporarily store the water or the like which had invaded from the inner peripheral sides of the inner races 613, 613, thereby preventing invasion of the water or the like into the bearing. A vent hole 619f is extended substantially from the center of this space 619d to reach the inside of the bearing, that is, the outer periphery of the main body 619a.

The vent hole 619f formed on the main body of the intermediate seal 619 is arranged to suck the air from the outside of the bearing into the bearing, or to evacuate the air from the inside of the bearing to the outside, so as to balance a pressure difference between the inside and the outside of the bearing. The vent hole 619f may be provided with suitable valve means or a suitable wall portion which permits gas to pass but does not permit fluid to pass.

(Seventh Embodiment)

A sealed rolling bearing according to a seventh embodiment of the invention will be described below. Note that the sealed rolling bearing according to the seventh embodiment is the same as that according to the first embodiment, apart from an intermediate seal 719.

Figure 9:
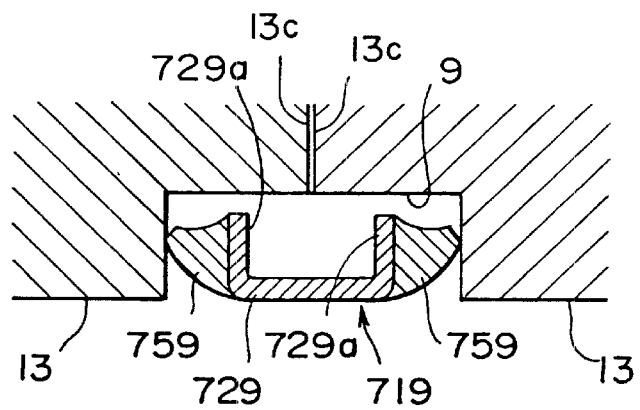
FIG. 9 is an enlarged cross-sectional view for illustrating a seal formed between inner races of a sealed rolling bearing according to the seventh embodiment of the present invention.

FIG. 9 is an enlarged cross-sectional view for illustrating the structure of the intermediate seal 719 for sealing a sealed rolling bearing on the side of the inner races 13, 13.

The intermediate seal 719 is comprised of an annular support member 729 having a U-shaped cross section, and a pair of lips 759, 759 formed of elastic members which are fixedly provided on bent portions 729a, 729a formed at both ends of the annular support member 729. The tip ends of both lips 759, 759 are brought into contact with the side surfaces of the recess 9, and a gap between the contact surfaces 13c, 13c of the paired inner races 13, 13 is sealed, whereby the air-tight condition inside the bearing can be maintained.

Figure 10:
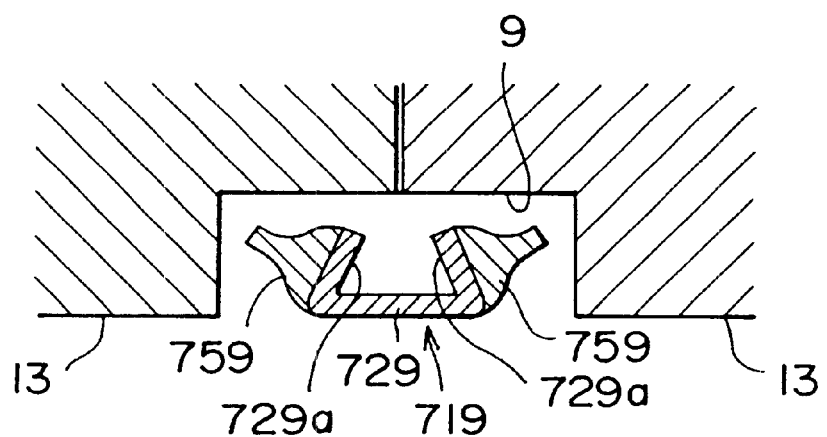
FIG. 10 is a view for illustrating an operation of the seal of FIG. 9.

FIG. 10 is an enlarged cross-sectional view corresponding to FIG. 9, for showing the heated state of the intermediate seal 719. As clearly seen from the drawing, when the annular support member 729 is heated, the bent portions 729a, 729a of the annular support member 729 are further bent so that the lips 759, 759 supported by the bent portions 729a, 729a are separated from the side surfaces of the recess 9. As a result, the air can be sucked from the outside of the bearing into the bearing, or can be evacuated from the inside of the bearing to the outside, so as to automatically balance a pressure difference between the inside and the outside of the bearing. Note that when the annular support member 729 returns to the normal temperature, the shape thereof returns to its original one, and the lips 759, 759 press the side surfaces of the recess 9. Consequently, the inside and the outside of the bearing can be sealed.

Figure 11:
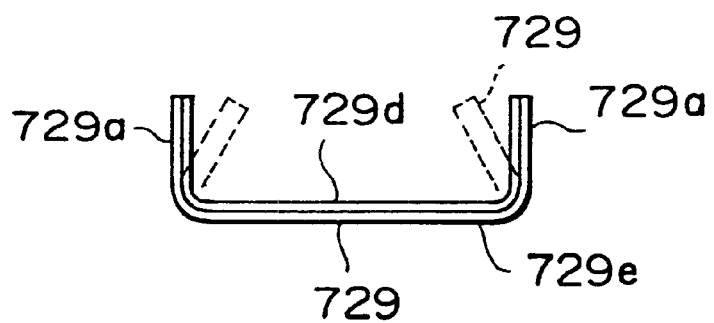
FIG. 11 is a view for illustrating the operation of the seal of FIG. 9.

FIG. 11 is a view for illustrating the structure of the annular support member 729. This annular support member 729 is formed by bonding plate members 729d, 729e of shape memory alloys having set temperatures together. The bent portions 729a, 729a are in a state of being bent substantially at right angles, as indicated by the solid lines, when the annular support member 729 is at the normal temperature. On the other hand, when the annular support member 729 becomes at a high temperature, the bent portions 729a, 729a are further bent at acute angles, as indicated by the dotted lines. Further, when the annular support members 729 return to the normal temperature, the bent portions 729a, 729a return to their original positions indicated by the solid lines.

In the above description, a member which is obtained by bonding the plate members 729d, 729e of shape memory alloys together is used as the annular support member 729. However, it is possible to use a bimetal member, instead, which is obtained by bonding materials having different coefficients of linear expansion. In this case, with an increase in temperature inside the sealed rolling bearing, the bimetal can be bent to remove the pressure difference between the inside and the outside of the bearing.

Note that the roll shaft 8 which is supported by the inner races 13, 13 is drawn out of the inner races 13,13 from every several hours to everyday to be exchanged. In this case, the inner diameter surfaces of the inner races 13, 13 may be exposed and may be subjected to high hydraulic pressure cleansing. In the case of the intermediate seal 719 of the seventh embodiment, since the lips 759, 759 and the inner races 13, 13 are usually closed when the roll shaft 8 is exchanged, the invasion of water or the like can be securely prevented.

Also, in the above description, the lips 759, 759 are arranged to be separated from the side surfaces of the recess 9. However, it is not always necessary to completely separate the lips 759, 759 from the side surfaces of the recess 9. For example, if a contact pressure with which the lips 759, 759 press the side surfaces of the recess 9 is adjusted by using deformation of the annular support member 729, both the sealing function and the ventilating function can be provided, so that when the sealing function is degraded, generation of a negative pressure inside the bearing can be prevented to some extent.

In addition, it is possible to provide a seal portion of various kinds of material which is deformed upon a change in temperature, so as to adjust the atmospheric pressure inside and outside the bearing by stopping or degrading the sealing function upon the increase in temperature of the bearing.

(Eighth Embodiment)

A sealed rolling bearing according to an eighth embodiment of the invention will be described below with reference to FIG. 12. Note that the sealed rolling bearing according to the eighth embodiment is the same as that according to the first embodiment, apart from an intermediate seal 819.

Figure 12A:
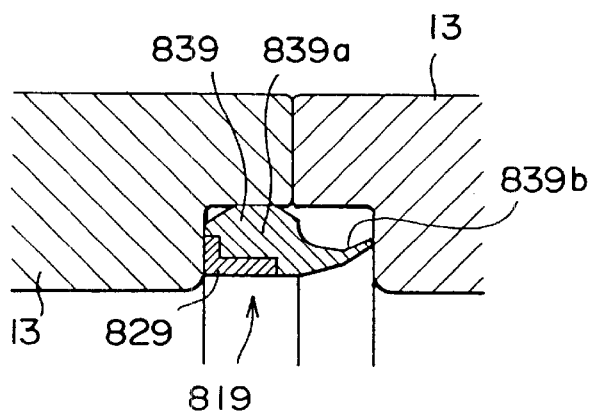
FIG. 12A is an enlarged cross-sectional view for illustrating a seal formed between inner races of a sealed rolling bearing according to the eighth embodiment of the present invention.

FIG. 12 is an enlarged cross-sectional view for illustrating the structure of the intermediate seal 819 for sealing a sealed rolling bearing on the side of the inner races 13, 13.

The intermediate seal 819 is comprised of a core metal 829 for maintaining the shape of the seal, and an elastic member 839 which is in tight contact with the side walls and the bottom wall of the recess 9 of one of the inner races 13. One lip 839b having elasticity is extended from the main part 839a of the elastic member 839. The lip 839b is brought into contact with the side surface of the recess 9 of the other inner race 13 toward the inside of the bearing.

Figure 12B:
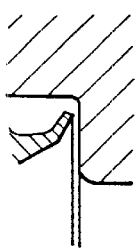
FIG. 12B is a view for showing a part of FIG. 12A in a state where a seal lip is flexed due to the centrifugal force.

When the lip 839b is brought into contact with the side wall of the recess inward as described so as to generate the negative pressure inside the bearing, or when the inner races are rotated upon driving of the apparatus, the lip is easily flexed due to the centrifugal force, to provide a ventilating function (see FIG. 12B).

Figure 12C:
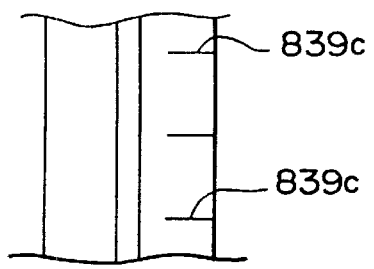
FIG. 12C is a view for illustrating a part of the seal seen from the inside in the radial direction.

The lip 839b may be provided with slits 839c over the entire periphery thereof at proper positions in the axial direction, as shown in FIG. 12C, or, instead of the slits, may be provided with portions having different rigidity so as to adjust the degree of the enhanced ventilating function when the negative pressure is generated or when the bearing is driven.

(Ninth Embodiment)

Figure 13:
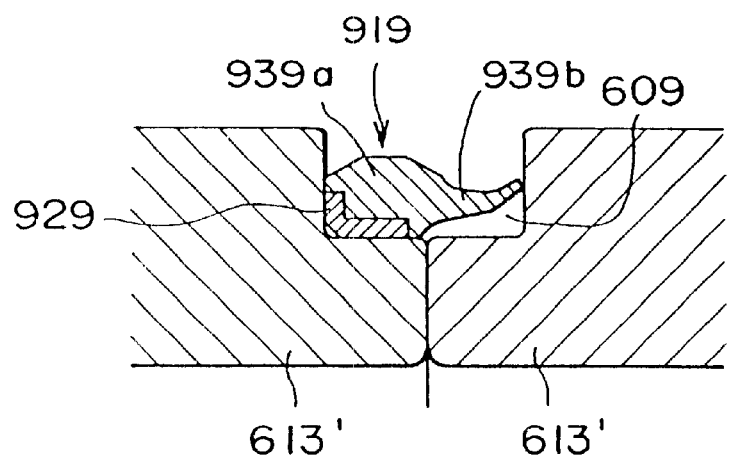
FIG. 13 is an enlarged cross-sectional view for illustrating a seal formed between inner races of a sealed rolling bearing according to the ninth embodiment of the present invention.

A sealed rolling bearing according to a ninth embodiment of the invention shown in FIG. 13 is provided with a recess 609 which is formed on the outer diameter surface side of the facing surfaces of the inner races 613', 613'. The facing surfaces other than the recess 609 are brought into contact with each other. An intermediate seal 919 having the same structure as the intermediate seal 819 shown in FIG. 12 is provided in the recess 609. The ninth embodiment has the same structure as the sixth embodiment, apart from the inner races 613', 613' and the intermediate seal 919.

In the ninth embodiment, the intermediate seal has a core metal 929, and the main body of the seal is brought into contact with the side wall and the bottom wall of the recess of the left inner race 613'. A seal lip 939b protruding from the main body 939a of the intermediate seal 919 is brought into pressure contact with the side wall of the recess 609 of the right inner race 613' toward the inside of the bearing.

It is possible to provide slits in the same manner as in the eighth embodiment, or portions having different rigidity also on the lip 939b of the intermediate seal 919 according to the ninth embodiment.

A function of the intermediate seal in the ninth embodiment is the same as that of the seal of the sixth embodiment shown in FIG. 7.

(Tenth Embodiment)

Figure 14:
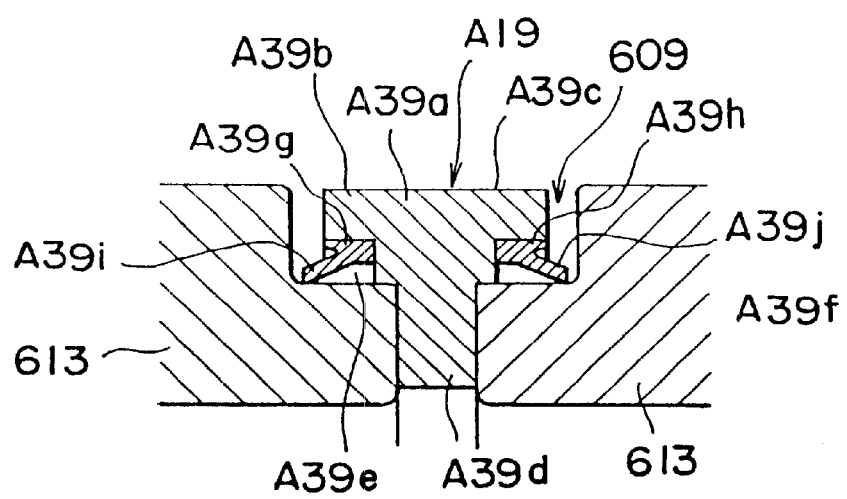
FIG. 14 is an enlarged cross-sectional view for illustrating a seal formed between inner races of a sealed rolling bearing according to the tenth embodiment of the present invention.

FIG. 14 shows a tenth embodiment of the invention. The tenth embodiment has the same structure as that of the rolling bearing of the sixth embodiment, apart from an intermediate seal thereof. Inner races 613, 613 of this embodiment are arranged to form a recess 609 on the facing surfaces of the inner races on the outer diameter side, with a predetermined gap between the facing surfaces.

An annular intermediate seal A19 takes a bilateral symmetrical form having portions A39b, A39c which are extended from the main body portion A39a through the recess 609 of the inner races toward the two ends in the axial direction, and a portion A39d which is brought into contact with the facing surfaces of the inner races 613, 613 and is extended through the gap in the axial direction.

Recesses A39e, A39f are respectively formed on the main body A39a of the intermediate seal to face the bottom wall of the recess of the inner races 613, 613, and elastic seals A39g, A39h are fixedly provided there. Lips A39i, A39j which are integrally formed with the elastic seals are brought into contact with the bottom surface portions of the recess of the inner races 613, 613 toward the inside of the bearing.

A function of this intermediate seal A39 is the same as that of the sixth embodiment.

(Eleventh Embodiment)

Figure 15:
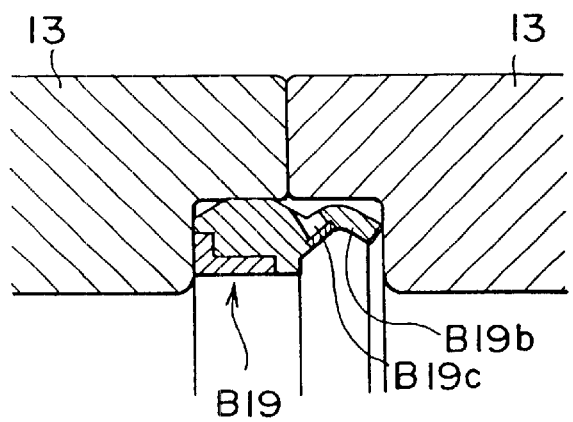
FIG. 15 is an enlarged cross-sectional view for illustrating a seal formed between inner races of a sealed rolling bearing according to the eleventh embodiment of the present invention.

The structure of a rolling bearing shown in FIG. 15 according to an eleventh embodiment of the invention is the same as that shown in FIG. 1, apart from an intermediate seal B19 thereof. More specifically, according to the eleventh embodiment, the structures of the inner races 13, 13 are the same as those shown in FIG. 1. The eleventh embodiment is different from the first embodiment only in that a lip B19b of the intermediate seal B19 has a vent portion B19c formed of a material which transmits only gases, but no liquid, instead of the slit 69b of the vent hole 69 which is provided on the intermediate seal 19 of the first embodiment shown in FIG. 2.

(Twelfth Embodiment)

Figure 16A:
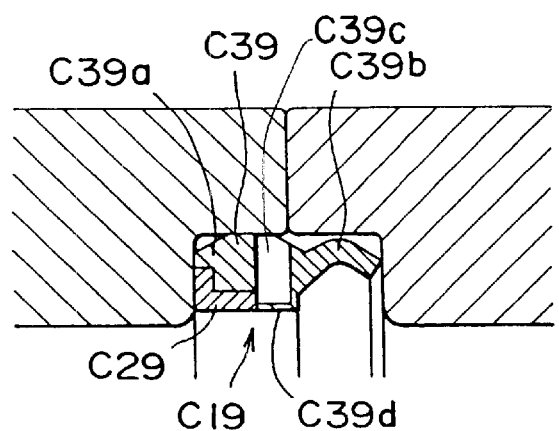
FIG. 16A is an enlarged cross-sectional view for illustrating a seal formed between inner races of a sealed rolling bearing according to the twelfth embodiment of the present invention.
Figure 16B:
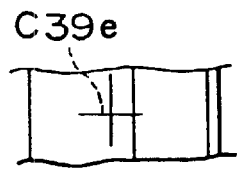
FIG. 16B is a view for illustrating a part of the seal seen from the inside in the radial direction.

The structure of a rolling bearing according to a twelfth embodiment shown in FIGS. 16A and 16B is the same as that shown in FIG. 1, apart from an intermediate seal C19 thereof.

The intermediate seal C19 of the twelfth embodiment is different from that of the first embodiment only in the position of a vent hole. In the twelfth embodiment, the intermediate seal C19 is comprised of an elastic member C39 and a core metal C29. The elastic member C39 is integrally formed with a main body C39a and a lip C39b. A vent hole C39C is formed in the main body C39a, and a cross-shaped slit C39e is formed on a partition wall C39d on the bottom of the vent hole.

The ventilating function according to the twelfth embodiment is the same as that of the first embodiment and that of the eleventh embodiment. In addition, according to the present embodiment, since the vent hole is not formed in the lip portion, an adverse influence of the vent hole on the performance of the lip can be avoided.

Instead of having the slit C39e, the partition wall C39d may be made of a material which transmits only gases and no liquid as shown in the embodiment of FIG. 15.

(Thirteenth Embodiment)

Figure 17A:
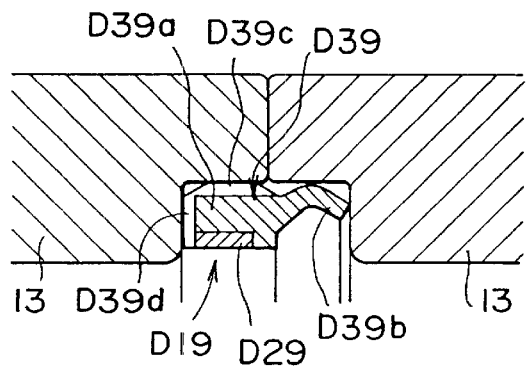
FIG. 17A is an enlarged cross-sectional view for illustrating a seal formed between inner races of a sealed rolling bearing according to the thirteenth embodiment of the present invention.
Figure 17B:
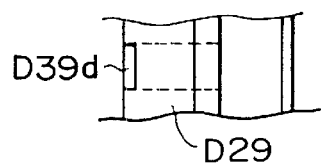
FIG. 17B is a view for illustrating a part of the seal seen from the inside in the radial direction.

The structure of a rolling bearing according to a thirteenth embodiment shown in FIGS. 17A and 17B is the same as that shown in FIG. 1, apart from an intermediate seal D19.

The intermediate seal D19 of the thirteenth embodiment is comprised of a core metal D29 and an elastic member D39. The elastic member D39 is integrally formed with a main body D39a and a lip D39b which is protruded from the main body. The main body D39a is urged upon the side wall and the bottom wall of the recess 9 of the left inner race 13, and the tip end of the lip D39b is urged upon the side wall of the recess 9 of the right inner race 13 outward the outside of the bearing.

In the thirteenth embodiment, there are respectively formed between the main body D39a of the elastic member D39 and the bottom wall and the side walls of the recess of the left inner race 13 axial slits D39c and radial slits D39d at proper intervals over the entire periphery thereof. The slits D39c and the slits D39d communicate with each other, to form a vent portion. The axial slits D39c and the radial slits D39d are preferably provided with a little phase shift therebetween.

Figure 18:
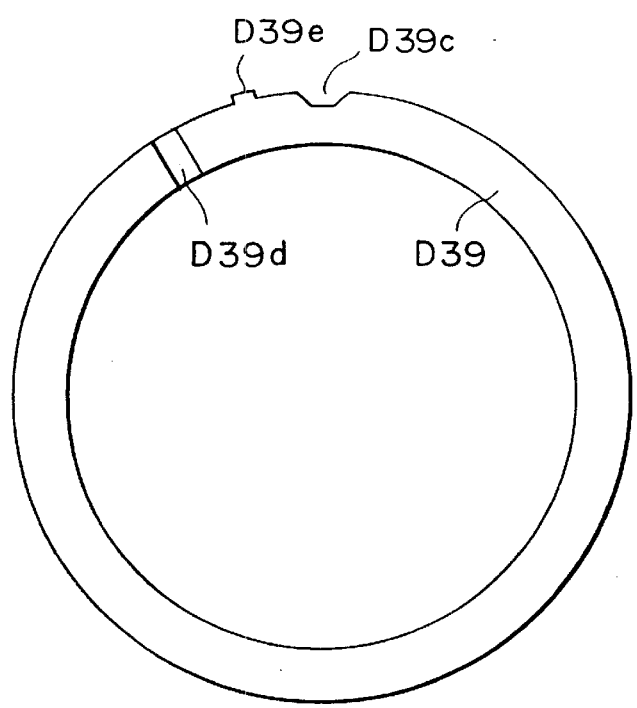
FIG. 18 is an enlarged front view for illustrating a seal formed between the inner races of the sealed rolling bearing of the thirteenth embodiment.

FIG. 18 is a schematic view of this intermediate seal D39, seen from the left side in FIG. 17, for illustrating one of the plural axial slits D39c and one of the plural radial slits D39d.

The function of the thirteenth embodiment is the same as that of the first embodiment.

In addition, it is possible to form intervening ribs D39e projected radially outwardly in the main body D39a of the elastic member of the intermediate seal D19 at several positions in the circumferential direction so as to intervene between the radial slit D39 and the axial slit D39C at the outer periphery of the seal, thereby setting a longer flow path. Consequently, the function of preventing invasion of water or other foreign substances through the slit D39d can be enhanced.

It is also possible to provide a valve with a slit, like in the first embodiment shown in FIG. 2, or a filter member to transmit only gases but no fluid, like in the eleventh embodiment shown in FIG. 15, in the flow path of a vent mechanism which includes the axial slits D39c and the radial slits D39e.

(Fourteenth Embodiment)

Figure 19A:
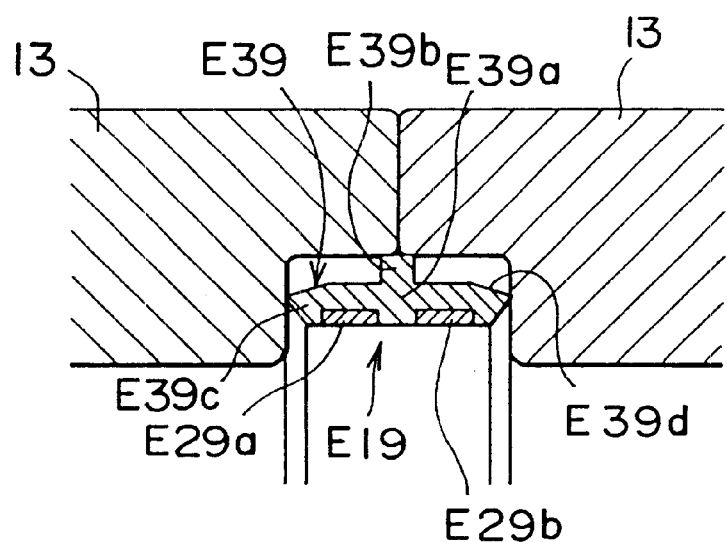
FIG. 19A is an enlarged cross-sectional view for illustrating a seal formed between inner races of a sealed rolling bearing according to the fourteenth embodiment of the present invention.
Figure 19B:
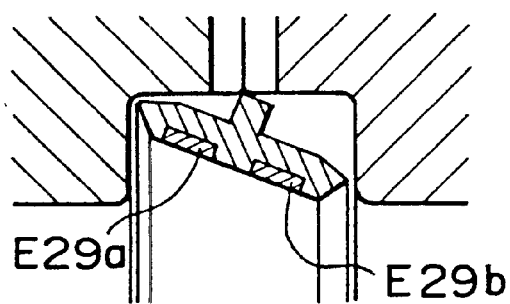
FIG. 19B is a cross-sectional view for illustrating an operation of the seal.

A rolling bearing of a fourteenth embodiment shown in FIGS. 19A and 19B is the same as that of the first embodiment, except an intermediate seal E19.

The intermediate seal E19 in the fourteenth embodiment has a bilateral symmetrical structure, comprised of a pair of annular core metal members E29a, E29b which are made of bimetal or shape memory alloy and separated from each other bilaterally and symmetrically, and an annular elastic member E39. The elastic member E39 has a radially-outward annular protrusion E39b at the center thereof protruded in the axial direction from the main body E39a. The radially-outward annular protrusion E39a has a flat outer peripheral surface. Annular lip portions E39b, E39c are formed at the two ends in the axial direction to be outward over the entire periphery from the main body E39a of the elastic member E39. The axial annular lip portions E39c, E39d are urged upon the side walls of the recess formed by the inner races 13, 13, respectively, at the tapered tip ends thereof, at the normal temperature during non-operation time of the bearing, as shown in FIG. 19A, thereby securely preventing water or other foreign substances from invading into the bearing.

The intermediate seal E19 of the fourteenth embodiment is inclined as a whole, as shown in FIG. 19B, due to the function of the core metals E29a, E29b made of bimetal or shape memory alloy, when the bearing temperature is increased during the operation, whereby the ventilating function can be enhanced to remove the pressure difference between the inside and the outside of the bearing.

(Fifteenth Embodiment)

A rolling bearing of a fifteenth embodiment shown in FIG. 20 is the same as that of the first embodiment, apart from an intermediate seal F19.

Figure 20A:
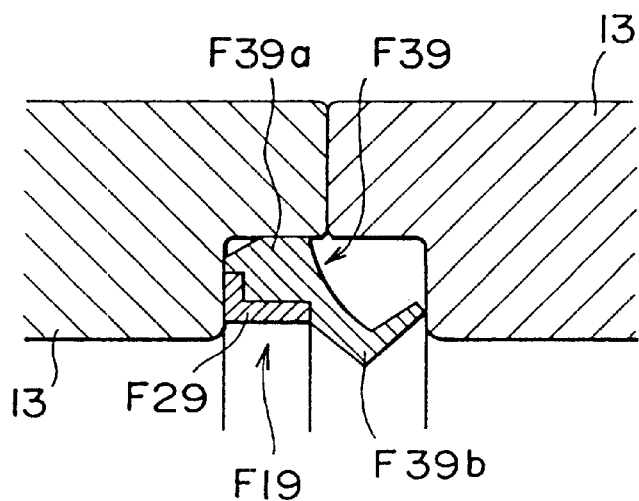
FIG. 20A is an enlarged cross-sectional view for illustrating a seal formed between inner races of a sealed rolling bearing according to the fifteenth embodiment of the present invention.
Figure 20B:
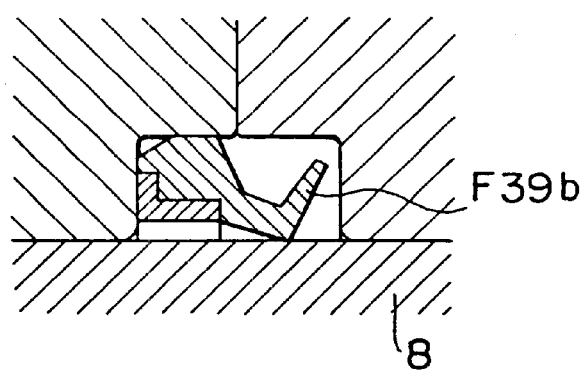
FIG. 20B is a partial cross-sectional view of the seal when the bearing is mounted on the shaft.

According to the fifteenth embodiment, the intermediate seal F19 which is fitted with pressure in a recess between the facing surfaces of the inner races 13, 13, is comprised of an annular core metal F29 and an annular elastic member F39. The annular elastic member F39 is comprised of a main body F39a which is urged upon the bottom wall and the side wall of the recess of the left inner race 13 and a lip portion F39b protruding from the main body. A central downward bent portion of the lip portion F39b takes a more inward position in the radial direction than the inner diameter surfaces of the inner races 13, 13 in the normal state, that is, in a state where the rolling bearing is removed from the roller shaft 8 as shown in FIG. 20A. On the other hand, the tip end of the lip is urged upon the side wall of the recess of the right inner race 13 to be tightly sealed, thereby preventing water or other foreign substances from invading from the inner diameter side into the bearing. In this intermediate seal F19, when the rolling bearing is assembled in the shaft 8, as shown in FIG. 20B, the inner diameter surface of the lip F39b is pushed onto the outer peripheral surface of the shaft 8 to be flexed outward in the radial direction, so that the tip end of the lip is separated from the side walls of the recess of the right inner race 13 to enhance the ventilating function.

(Sixteenth Embodiment)

Figure 21:
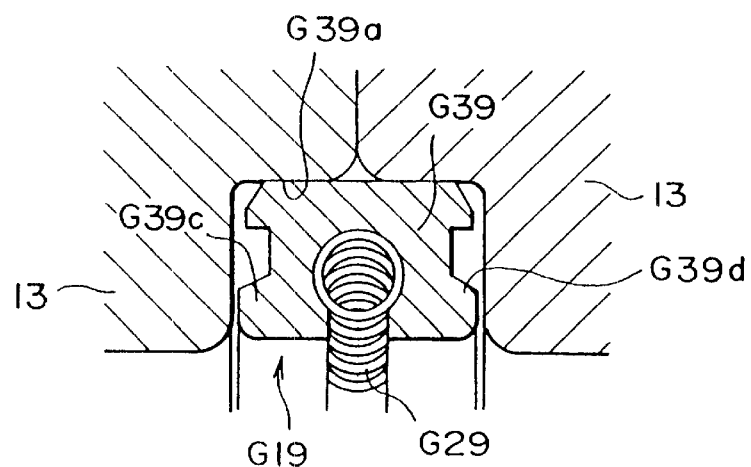
FIG. 21 is an enlarged front view for illustrating a seal formed between inner races of a sealed rolling bearing of the sixteenth embodiment.

A rolling bearing of a sixteenth embodiment of the invention shown in FIG. 21 is the same as that of the first embodiment shown in FIG. 1, apart from an intermediate seal G19.

According to the sixteenth embodiment, the intermediate seal G19 which is provided in a recess formed between the facing surfaces of the right and left inner races 13, 13 has a bilateral symmetrical structure, and is comprised of an annular elastic member G39 and a retaining member G29 which is made of, for example, a coil spring fitted in an annular recess at the center of the inner diameter of the annular elastic member G39. This retaining member presses the elastic member toward the outer diameter by its elasticity.

The elastic member G39 has an outer peripheral surface G39a having the same diameter, and is brought into face-to-face pressure contact with the bottom wall surface of the recess between the inner races 13, 13 at the outer peripheral surface, so as to seal the inside and outside of the bearing. The left and right side portions G39c, G39d of the elastic member G39 are arranged not to be brought into contact with the side walls of the recess between the right and left inner races 13, 13. The elastic member G39 may be made from synthetic rubber such as NBR or FKM or synthetic resin such as polyamide resin.

In the sixteenth embodiment, the intermediate seal G19 and the inner races 13, 13 are brought into contact with each other in a face-to-face manner, whereby a contact surface pressure is decreased to thereby obtain an enhanced ventilating function.

Description will be made below of a comparative test between a structure in which the seal is comprised of an intermediate seal member and inner race surfaces brought into face-to-face contact with each other, as shown in FIG. 21, and a structure in which the seal is comprised of a seal lip of the intermediate seal member and the inner race surfaces brought into linear contact with each other, as in the conventional example shown in FIG. 22.

Figure 27:
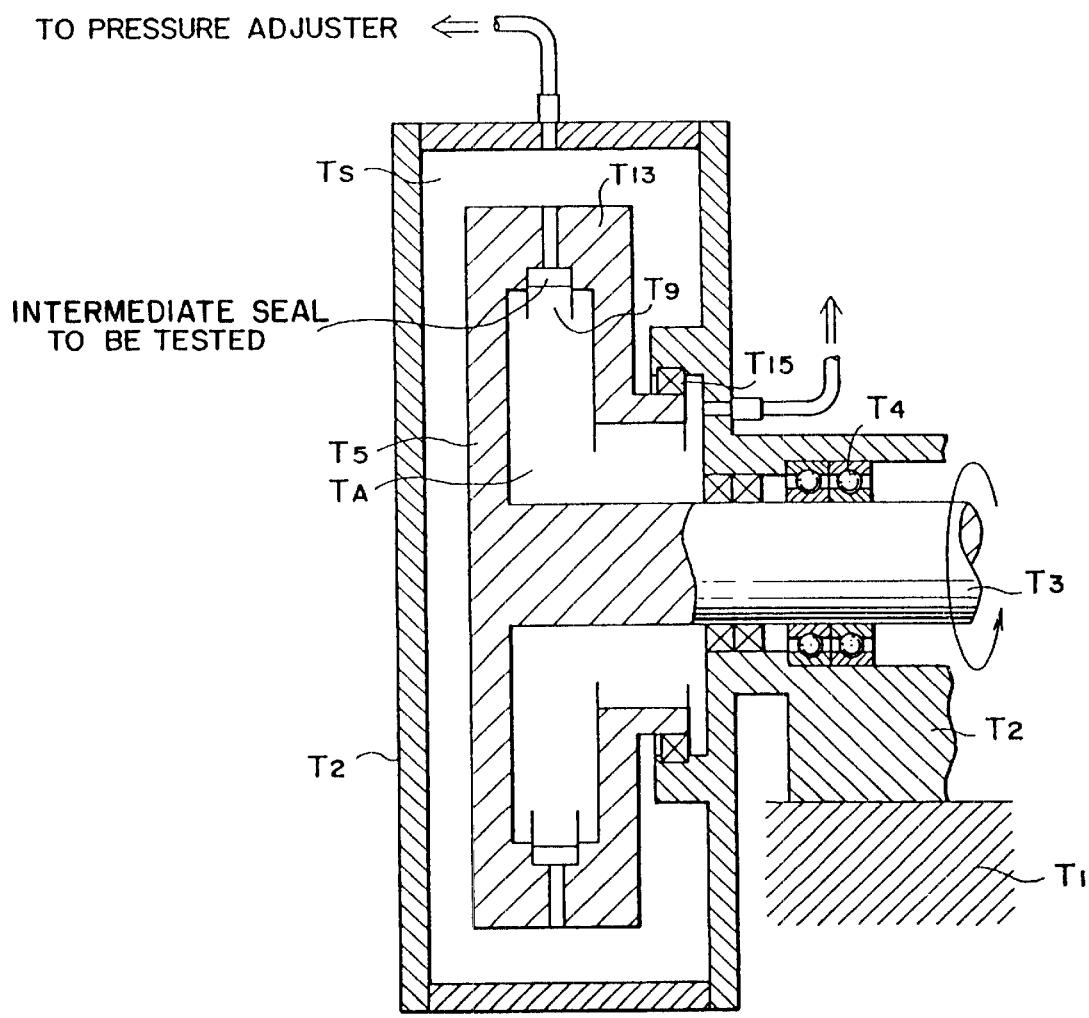
FIG. 27 is partial cross-sectional view for illustrating an experimental apparatus used in the comparative experiment.
Figure 30:
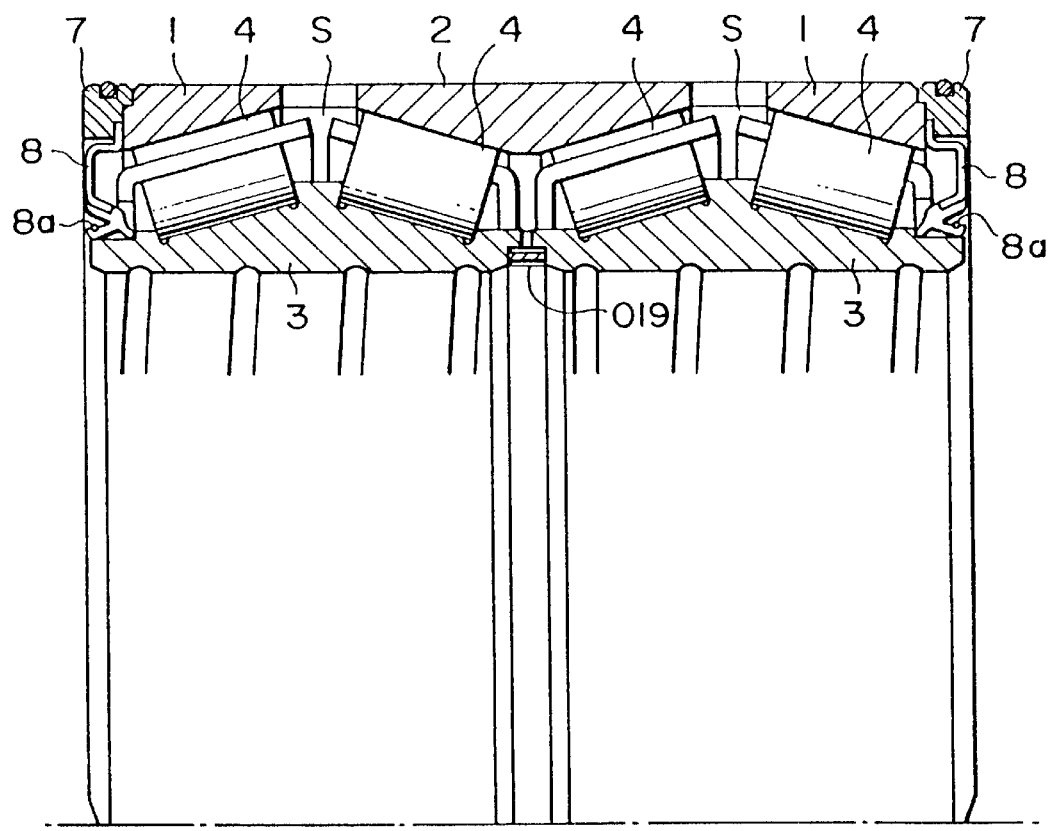
FIG. 30 is a view for illustrating the structure of the sealed rolling bearing of the prior art.
Figure 31:
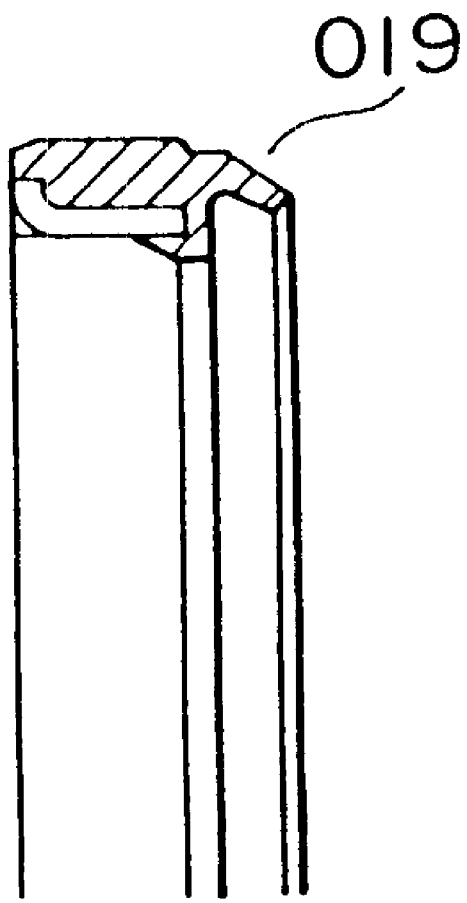
FIG. 31 is an enlarged view of the main portion of the intermediate seal shown in FIG. 30.

FIG. 27 is a schematic partial cross-sectional view of an apparatus used in this comparative test. The test apparatus has a sealed housing T2 which is fixed to a table T1. A rotary shaft T3 is supported through a bearing T4 in the central part of the sealed housing T2. Two race members T13, T13 which are corresponding to the inner races of the rolling bearing of the present invention are aligned in the axial direction on the outer periphery of the rotary shaft through a flange T5 which is integrally assembled with the rotary shaft. A recess T9 is formed in the inner diameter portions of the facing surfaces of the race members. A chamber TA on the inner diameter side formed between the race members T13, T13, the rotary shaft T3, and the housing T2 is separated from an inner surface of the housing T2, and a space TS corresponding to the inside of the bearing is formed outside the race members T13, T13, with a seal member T15 therebetween. The recess T9 is provided with a communication hole between the space corresponding to the inside of the bearing and the inner diameter side chamber. The chamber TA on the inner diameter side is opened to the air, while the space TS corresponding to the inside of the bearing communicates with a pressure adjusting member.

Figure 22:
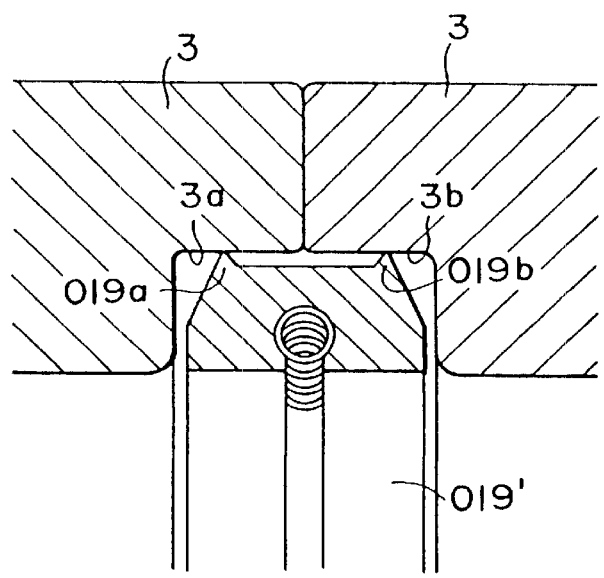
FIG. 22 is an enlarged partial cross-sectional view for illustrating a seal of the prior art.
Figure 23:
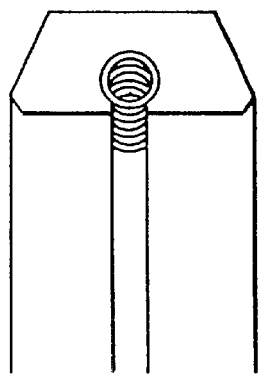
FIG. 23 is a view for illustrating a seal of the present invention which is used in a comparative experiment between the seal of the present invention and that of the prior art.

The test is performed by fitting a face-to-face contact intermediate seal which is corresponding to the intermediate seal of the sixteenth embodiment of the present invention shown in FIG. 23 and a linear-contact seal corresponding to the seal of the conventional example shown in FIG. 22 into the recess T9 formed between the facing surfaces of the two race members T13, T13.

Figure 24:
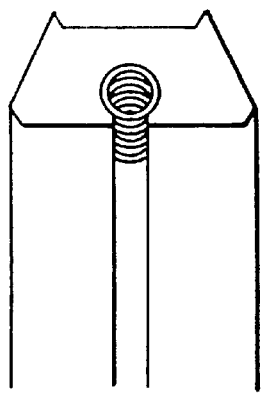
FIG. 24 is a view for illustrating a seal of the prior art which is used for a comparative experiment between the seal of the present invention and that of the prior art.
Figure 25:
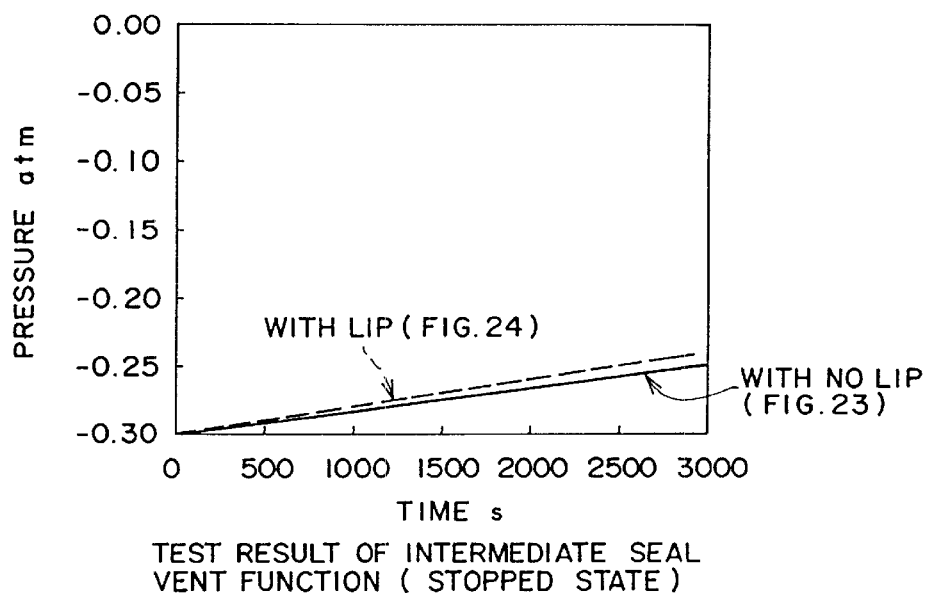
FIG. 25 is a graph for showing a result of the comparative test (in the stopped state).
Figure 26:
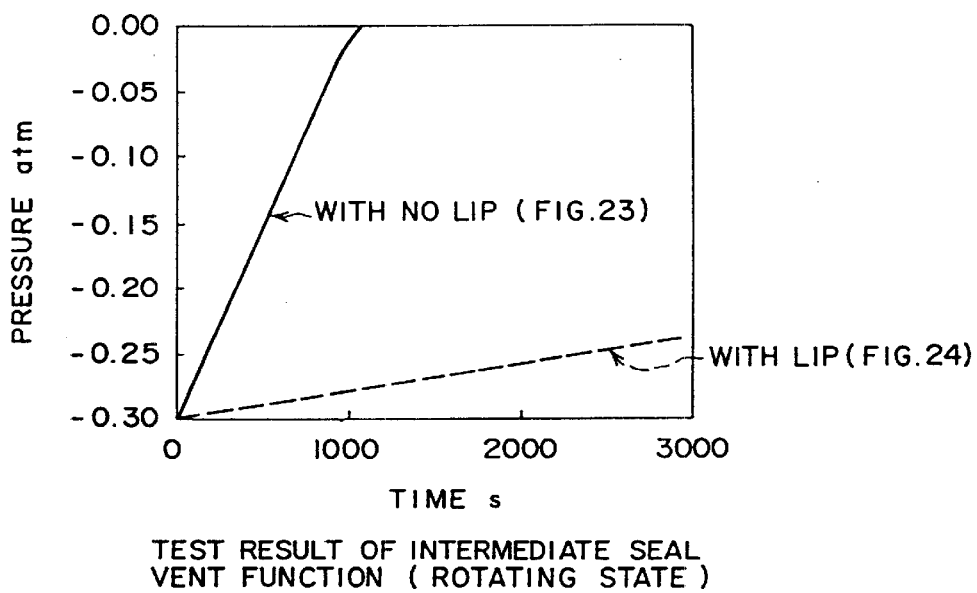
FIG. 26 is a graph for showing a result of the comparative test (in the rotating state).

FIG. 25 and FIG. 26 show test results of the ventilating function of the intermediate seal of the present invention shown in FIG. 23 and that of the intermediate seal of the prior art shown in FIG. 24. The experiment is to observe and compare internal pressure changes (the ventilating functions) by making a pressure in the space corresponding to the inside of the bearing to be negative in advance. The broken line in the drawing indicates the change according to the conventional art and the solid line indicates the change according to the present invention. In a stationary state shown in FIG. 25, a difference between the two cases is not great. However, at the time of rotation, the pressure is restored to the atmospheric pressure for 1000 seconds or so in case of the face-to-face contact seal. On the other hand, the pressure is not restored to the atmospheric pressure when 3000 seconds have elapsed in case of the linear-contact seal. It can be understood that the ventilating function is conspicuously enhanced by the face-to-face contact seal.

As described above, according to the present invention, there is provided on the side of the above-mentioned inner races the vent means which approximates the fluid pressure inside the bearing space to the outside fluid pressure by causing the air in the bearing space to communicate with the outside air when a difference between the fluid pressure in the bearing space and the outside fluid pressure becomes a predetermined value or more. Consequently, if, for example, the heated sealed rolling bearing is cooled, the fluid pressure in the bearing space is approximated to the outside fluid pressure, so that water or the like are not taken into the bearing space.

What is claimed is:

1. A sealed, self-lubricated rolling bearing in which a rolling member is disposed in a bearing space formed between an outer race and an inner race to rotate said outer race and said inner race relatively to each other, non-vented side seal members are disposed at opposite ends of said bearing space in an axial direction thereof, and said inner race is provided with a bore seal, thereby sealing said bearing space, characterized in that:

said inner race is provided with vent means for approximating a fluid pressure in said bearing space to an outside fluid pressure when a state of said fluid in said bearing space and a state of said outside fluid have a predetermined relationship.

2. A sealed rolling bearing according to claim 1, wherein said inner race includes two inner race elements adjacent in the axial direction, an intermediate seal is disposed between these two inner race elements, and said vent means is disposed on said intermediate seal.

3. A sealed rolling bearing according to claim 2, wherein said vent means includes a valve with a slit.

4. A sealed rolling bearing according to claim 2, wherein said intermediate seal includes a seal main body and a seal lip integrally formed with said seal main body as a unitary structure, and a valve with a slit capable of causing the inside of the bearing to communicate with the outside thereof is formed on said seal main body or the seal lip.

5. A sealed rolling bearing according to claim 2, wherein said vent means comprises a shape memory alloy or a bimetal, and said intermediate seal is deformed by an increase of temperature to cause the inside of the bearing to communicate with the outside.

6. A sealed rolling bearing according to claim 2, wherein said vent means is formed of a material for transmitting gas and not transmitting liquid.

7. A sealed rolling bearing according to claim 2, wherein said intermediate seal includes a seal main body and a seal lip integral with said seal main body as a unitary structure, said seal lip has a part with a diameter smaller than an inner diameter of said inner race element in a natural condition, and, when said bearing is assembled to a shaft, said part with the smaller diameter is brought into contact with said shaft to flex said seal lip, thereby changing a ventilating performance.

8. A sealed rolling bearing according to claim 2, wherein said intermediate seal includes a seal main body and a seal lip integral with said seal main body as a unitary structure, said seal lip is brought into contact with one of said inner race elements toward the inside of the bearing, and the inside of the bearing is caused to communicate to the outside when a negative pressure of not less than a predetermined value is generated in said bearing or when a centrifugal force is caused by rotation of said inner race.

9. A sealed rolling bearing according to claim 2, wherein said intermediate seal includes a seal main body and a seal lip integral with said seal main body as a unitary structure, and a slit for adjusting the vent is disposed on said seal lip in an axial direction thereof.

10. A sealed rolling bearing according to claim 2, wherein said intermediate seal has elasticity and is brought into face-to-face contact with said two inner race elements so as to seal the inside from the outside of the bearing.

11. A sealed rolling bearing according to claim 1, wherein said inner race includes two inner race elements adjacent in an axial direction thereof, an intermediate seal is disposed between these two inner race elements, and a hole for ventilation is formed in the vicinity of said intermediate seal between said inner race elements.

12. A sealed rolling bearing according to claim 1, wherein said inner race includes two inner race elements adjacent in an axial direction thereof, an intermediate seal is disposed between these two inner race elements, and a hole for ventilation is formed on said intermediate seal for causing the inside of the bearing to communication with the outside when a negative pressure is generated in the bearing.

13. A sealed, self-lubricated rolling bearing in which a rolling member is disposed in a bearing space formed between an outer race and an inner race to rotate said outer race and said inner race relatively to each other, non-vented side seal members are disposed at opposite ends of said bearing space in an axial direction thereof, and said inner race is provided with a bore seal, thereby sealing said bearing space, characterized in that:

said inner race is provided with a vent structure operative to approximate a fluid pressure in said bearing space to an outside fluid pressure when a state of said fluid in said bearing space and a state of said outside fluid have a predetermined relationship, wherein said inner race includes two inner race elements adjacent in the axial direction, an intermediate seal is disposed between these two inner race elements, and said vent structure is disposed on said intermediate seal, and wherein said vent structure includes a valve with a slit.

14. A sealed, self-lubricated rolling bearing in which a rolling member is disposed in a bearing space formed between an outer race and an inner race to rotate said outer race and said inner race relatively to each other, non-vented side seal members are disposed at opposite ends of said bearing space in an axial direction thereof, and said inner race is provided with a bore seal, thereby sealing said bearing space, characterized in that:

said inner race is provided with a vent structure operative to approximate a fluid pressure in said bearing space to an outside fluid pressure when a state of said fluid in said bearing space and a state of said outside fluid have a predetermined relationship, wherein said inner race includes two inner race elements adjacent in the axial direction, an intermediate seal is disposed between these two inner race elements, and said vent structure is disposed on said intermediate seal, and wherein said intermediate seal includes a seal main body and a seal lip integrally formed with said seal main body as a unitary structure, and a valve with a slit capable of causing the inside of the bearing to communicate with the outside thereof is formed on said seal main body or the seal lip.

15. A sealed, self-lubricated rolling bearing in which a rolling member is disposed in a bearing space formed between an outer race and an inner race to rotate said outer race and said inner race relatively to each other, non-vented side seal members are disposed at opposite ends of said bearing space in an axial direction thereof, and said inner race is provided with a bore seal, thereby sealing said bearing space, characterized in that:

said inner race is provided with a vent structure operative to approximate a fluid pressure in said bearing space to an outside fluid pressure when a state of said fluid in said bearing space and a state of said outside fluid have a predetermined relationship, wherein said inner race includes two inner race elements adjacent in the axial direction, an intermediate seal is disposed between these two inner race elements, and said vent structure is disposed on said intermediate seal, and wherein said vent structure comprises a shape memory alloy or a bimetal, and said intermediate seal is deformed by an increase of temperature to cause the inside of the bearing to communicate with the outside.

16. A sealed, self-lubricated rolling bearing in which a rolling member is disposed in a bearing space formed between an outer race and an inner race to rotate said outer race and said inner race relatively to each other, non-vented side seal members are disposed at opposite ends of said bearing space in an axial direction thereof, and said inner race is provided with a bore seal, thereby sealing said bearing space, characterized in that:

said inner race is provided with a vent structure operative to approximate a fluid pressure in said bearing space to an outside fluid pressure when a state of said fluid in said bearing space and a state of said outside fluid have a predetermined relationship, wherein said inner race includes two inner race elements adjacent in the axial direction, an intermediate seal is disposed between these two inner race elements, and said vent structure is disposed on said intermediate seal, and wherein said vent structure is formed of a material for transmitting gas and not transmitting liquid.

17. A sealed, self-lubricated rolling bearing in which a rolling member is disposed in a bearing space formed between an outer race and an inner race to rotate said outer race and said inner race relatively to each other, non-vented side seal members are disposed at opposite ends of said bearing space in an axial direction thereof, and said inner race is provided with a bore seal, thereby sealing said bearing space, characterized in that:

said inner race is provided with a vent structure operative to approximate a fluid pressure in said bearing space to an outside fluid pressure when a state of said fluid in said bearing space and a state of said outside fluid have a predetermined relationship, wherein said inner race includes two inner race elements adjacent in the axial direction, an intermediate seal is disposed between these two inner race elements, and said vent structure is disposed on said intermediate seal, and wherein said intermediate seal includes a seal main body and a seal lip integral with said seal main body as a unitary structure, said seal lip is brought into contact with one of said inner race elements toward the inside of the bearing, and the inside of the bearing is caused to communicate to the outside when a negative pressure of not less than a predetermined value is generated in said bearing or when a centerifugal force is caused by rotation of said inner race.

18. A sealed, self-lubricated rolling bearing in which a rolling member is disposed in a bearing space formed between an outer race and an inner race to rotate said outer race and said inner race relatively to each other, non-vented side seal members are disposed at opposite ends of said bearing space in an axial direction thereof, and said inner race is provided with a bore seal, thereby sealing said bearing space, characterized in that:

said inner race is provided with a vent structure operative to approximate a fluid pressure in said bearing space to an outside fluid pressure when a state of said fluid in said bearing space and a state of said outside fluid have a predetermined relationship, wherein said inner race includes two inner race elements adjacent in the axial direction, an intermediate seal is disposed between these two inner race elements, and said vent structure is disposed on said intermediate seal, and wherein said intermediate seal includes a seal main body and a seal lip integrally with said seal main body as a unitary structure, and a slit for adjusting the vent is disposed on said seal lip in an axial direction there.

* * * * *